United States Patent [19]

Mulders

[11] Patent Number: 4,684,318

[45] Date of Patent: Aug. 4, 1987

[54] HYDROSTATIC BEARING FOR PUMPS AND THE LIKE

[75] Inventor: Johannes A. Mulders, Etten-Leur, Netherlands

[73] Assignee: Borg-Warner Corporation, Chicago, Ill.

[21] Appl. No.: 802,103

[22] Filed: Nov. 25, 1985

Related U.S. Application Data

[63] Continuation of Ser. No. 610,895, May 16, 1984, abandoned.

[51] Int. Cl.<sup>4</sup> .............................................. F04D 29/04
[52] U.S. Cl. .................................... 415/113; 415/110; 384/118
[58] Field of Search ............... 415/111, 112, 110, 109, 415/170 R, 175, 176, 199.1, 113, 173 R; 184/6.4, 6.11, 6.16, 6.28; 384/118, 120, 111, 112, 113, 399, 466

[56] References Cited

U.S. PATENT DOCUMENTS

| | | | |
|---|---|---|---|
| 2,921,533 | 1/1960 | Williams | 415/112 |
| 3,090,544 | 5/1963 | Woollenweber, Jr. et al. | 415/112 |
| 3,257,957 | 6/1966 | Tracy | 415/112 |
| 3,718,406 | 2/1973 | Onal | 415/199.1 |
| 4,121,839 | 10/1978 | Takano et al. | 415/112 |
| 4,128,362 | 12/1978 | Shepherd et al. | 415/112 |
| 4,168,867 | 9/1979 | Ando et al. | 91/28 |
| 4,276,002 | 6/1981 | Anderson | 415/112 |

*Primary Examiner*—Robert E. Garrett
*Assistant Examiner*—John Kwon
*Attorney, Agent, or Firm*—John W. Harbst

[57] ABSTRACT

A centrifugal pump having a shaft supported by a hydrostatic bearing to which energizing fluid is supplied by the pump itself. Upon failure of the energizing fluid supply, an auxiliary source supplies the energizing fluid. A one way valve operates in response to fluid pressure to permit the energizing fluid, either from the pump or the auxiliary supply.

1 Claim, 4 Drawing Figures

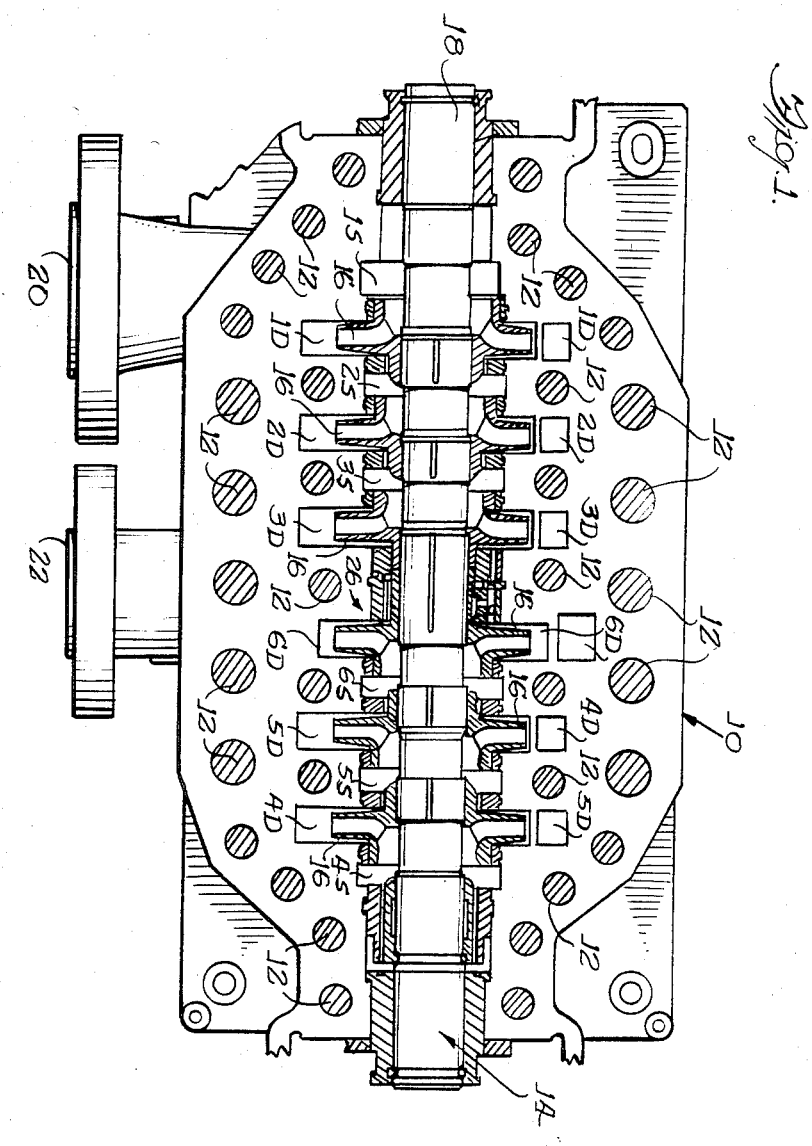

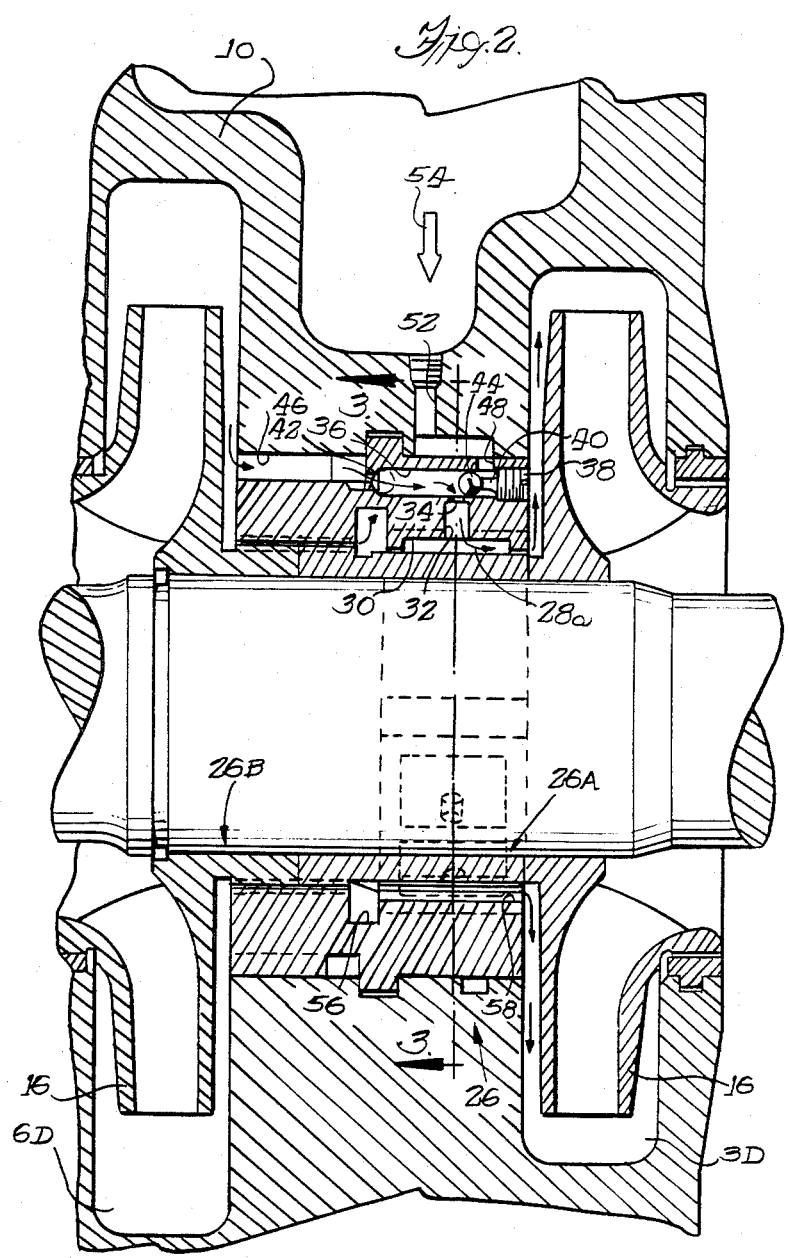

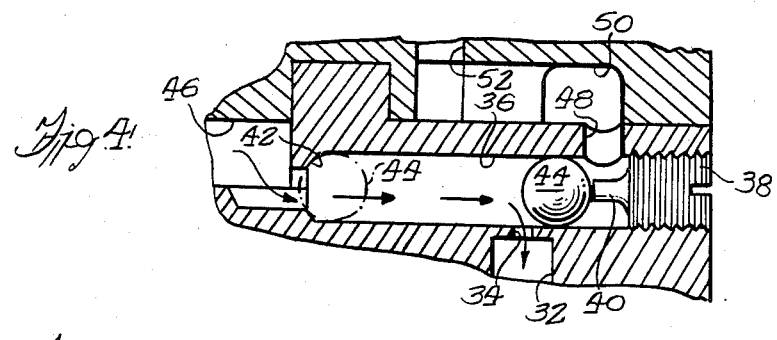
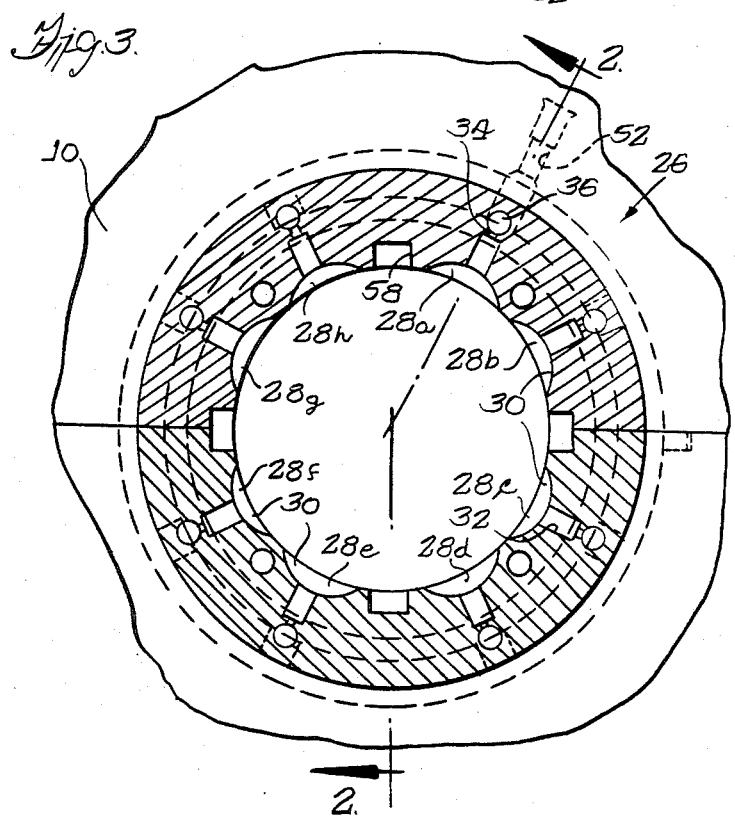

HYDROSTATIC BEARING FOR PUMPS AND THE LIKE

BACKGROUND OF THE INVENTION

This is a continuation of application Ser. No. 610,895, filed May 16, 1984, now abandoned.

1. Field of the Invention

The use of hydrostatic bearings to support the pump shaft of a centrifugal pump is known in the art. In order to be effective, hydrostatic bearings must be supplied with a fluid under pressure when the pump is operating. The fluid is usually the pump product which is desirable in that the pump case can be sealed, so that the product does not escape to the atmosphere. This is especially true when corrosive, radioactive and other atmosphere contaminating fluids are being pumped. However, in the event of a large pressure loss due to cavitation or other conditions, a hydrostatic bearing may run dry and be severly damaged which can severely hamper its function to support the pump shaft.

2. Description of the Prior Art

U.S. Pat. No. 3,671,137, issued June 20, 1972 to Ball, teaches the use of a hydrostatic bearing in a centrifugal pump in which an auxiliary centrifugal pumping means is used to circulate the bearing energizing fluid from the discharge zone of the main pump impeller. The auxiliary impeller is mounted on the same shaft as the main impeller.

U.S. Pat. No. 4,194,796, issued Mar. 25, 1980 to Svensson et al teaches a device for maintaining a required pump activated liquid pressure in a hydrostatic bearing during pump slowdown. An additional pump is used to supply the requisite liquid pressure to liquid in an accumulator and thence to the bearing. The patent teaches a rotatable ring with multiple hydrostatic bearings therearound, each bearing being supplied by liquid pressure by its own main pump and at least one additional pump to supply liquid pressure in case of a main pump slowdown.

SUMMARY OF THE INVENTION

The invention herein being described relates to a hydrostatic bearing usable in a centrifugal pump and especially in a multiple stage centrifugal pump, the bearing being generally located substantially midway between the ends of the pump case and between an intermediate stage and the final stage. The pressure differential between the stages of a multiple stage pump can be significant, as for example, over 400 psi in a twelve stage pump.

The hydrostatic bearing of this invention centers the pump or impeller shaft in the pump casing, and is supplied with energizing fluid pressure from the final stage of the pump. The energizing fluid flows through the bearing and back to an intermediate stage.

To avoid damage to the shaft and seizure of the bearing in the event that the internal fluid pressure flow ceases due to pump failure or cavitation, means responsive to the fluid pressure or the lack of same is provided to supply fluid pressure to the bearing, said means comprising an external source and an integral one-way valve. The valve, incorporated in the bearing in the form of a ball in a cylindrical track, automatically permits the flow of fluid pressure from the auxiliary source when the internal pressure flow ceases, and automatically shuts off the auxiliary supply of fluid pressure upon resumption of the normal pump operation. Any suitable device can be used to provide the auxiliary fluid pressure supply, so long as it is independent of the centrifugal pump incorporating the subject hydrostatic bearing.

BRIEF DESCRIPTION OF THE DRAWINGS

FIG. 1 is a partial sectional view of a multistage centrifugal pump taken longitudinally through the pump case and along the major axis of the pump impeller assembly, showing the hydrostatic bearing of this invention;

FIG. 2 is a partial sectional view of a portion of a multistage centrifugal pump on an enlarged scale illustrating the hydrostatic bearing and one-way valve of this invention taken longitudinally through the pump case and along line 2-2 of FIG. 3;

FIG. 3 is a partial sectional view taken on line 3—3 of FIG. 2; and

FIG. 4 is an enlarged sectional view of the valve shown in FIG. 2.

DESCRIPTION OF THE PREFERRED EMBODIMENT

Referring to FIG. 1 of the drawings, a typical pump case is designated by the reference numeral 10 and is generally of two piece construction. Only the lower part is shown, the parts being connected together in fluid tight relation by a pattern of fastener studs 12, shown in cross-section. An impeller assembly 14 is suitably journaled in case 10 and comprises a plurality of centrifugal impellers 16 mounted on an impeller shaft 18 for rotation therewith, the shaft being rotatably driven by a suitable motor (not shown). Each impeller 16, is disposed in alignment within stage discharge chambers 1D to 6D as shown with the suction throat of each impeller in communication with respective suction chambers 1S to 6S. Case 10 is equipped with a fluid suction inlet 20 and a fluid discharge outlet 22.

Interconnected passageways (not shown) are defined in case 10. To maintain the fluidic integrity of the pump, such interconnected passageways are fluidically sealed to the environment outside the pump case and serve to connect the successive stages of chambers as follows: chamber 1D to chamber 2S; chamber 2D to chamber 3S; chamber 3D to chamber 4S; chamber 4D to chamber 5S; and chamber 5D to chamber 6S. Passageways (not shown) are also defined in case 10 to connect suction inlet 20 with suction chamber 1S and discharge chamber 6D with discharge outlet 22.

Various devices are used to substantially eliminate leakage of the pump product along the shaft 18 to the exterior of the case and into the environment in which the pump is used. As seen in FIG. 1, the hydrostatic bearing 26 of this invention supports the shaft 18 substantially midway of its axial extent.

FIG. 2 illustrates, on an enlarged scale, a portion of the case 10, shaft 18, impellers 16, discharge chambers 3D and 6D and the hydrostatic bearing 26 which centers the shaft 18 in the case 10. One part 26A of the hydrostatic bearing 26 (see also FIG. 3) comprises a plurality, specifically 8, of pockets 28a, 28b, 28c, 28d, 28e, 28f, 28g and 28h spaced circumferentially around its inner bore and opening inwardly of the bearing. As seen especially in FIG. 3, these pockets are concave, the wall 30 of each pocket providing an inwardly facing cylindrical surface. Each pocket 28a through 28h has a hole 32 located centrally thereof. Each hole 32 has a restricted portion 34, and opens into an axially aligned cylindrical bore 36 (see also FIG. 4). The bore 36 is closed at one end by a plug 38 having a projecting portion 40, and is restricted at the other end to form a seat 42 for a ball 44. The projecting portion 40 also forms a seat for the ball 44 during normal pump operation. The restricted end 42 of each bore 36 communicates with an axial passageway 46 which is fluidically sealed to the environment outside of the pump case and which is formed at the juncture of the bearing and the case and which is arranged in series with the interconnected passageway which communicates with discharge chamber 6D.

A series of radially oriented openings 48 are provided in the wall of the bearing. Each opening has one end opening into the bore 36 and the other end opening into a circular chamber 50, the latter being connected to a passageway 52 which is fludically sealed to the environment outside of the pump case and is connected to an external fluid pressure source 54. In the drawings, the fluid passageway 52 is radially aligned with the pocket 28a; however, it could be placed in a different location or with a different orientation without departing from the spirit of the invention.

The external pressure source 54 can be of any type which is operated independently of the pump construction described, so that it can supply fluid under pressure to the hydrostatic bearing when cavitation occurs.

Another part 26B of the hydrostatic bearing 26, is generally cylindrical having a very small clearance with the shaft 18. This part is provided with an open ended cylindrical cavity 56 which communicates with a plurality of open ended axial slots 58 in part 26A.

OPERATION

When the pump is operating normally, fluid is pumped from suction inlet 20 to discharge outlet 22 and in the flow pattern described before. Fluid under discharge pressure passes through passageways 46 into cylindrical bores 36, through restricted portions 34 of holes 32; into holes 32 and into the respective pockets 28a through 28h around the shaft 18 and back to intermediate stage chamber 3D from whence it flows to and through the other stages of the pump to ultimate discharge. There may be some flow into cavity 56 and then to one or more slots 58. From slots 58, the fluid flow is to the intermediate stage chamber 3D and so forth. Flow along the shaft surrounded by part 26B is to cavity 58, to slots 58, and thence to chamber 3D.

In the event that the fluid pressure flowing into the pockets 28a through 28h falls below a predetermined level which is below the pressure of the fluid at the auxiliary source 54, the auxiliary source pressure will move the balls 44 away from projection 40 and cause them to move toward seat 42, which permits flow of fluid pressure from passageway 52, chamber 50, through openings 48 into the bores 36 and thence to pockets 28a through 28h, thus protecting the bearing and providing continued centering of the shaft when pump malfunction occurs. Upon return to normal operation and with the pump pressure above the auxiliary pressure, the balls automatically return and seat against the projection 40, blocking fluid entry from passages 52 and 48 into bores 36.

The appended claims are intended to cover all reasonable equivalents of the recited structure.

I claim:
1. A centrifugal pump comprising:
 a pump case including at least one pumping chamber therein;
 a shaft rotatably mounted in said case;
 a centrifugal impeller disposed in said chamber and supported by said shaft, said impeller being constructed and arranged for receiving product fluid from a suction inlet and moving said product fluid to a discharge outlet at an increased energy level in response to rotation of said shaft;
 a hydrostatic bearing mounted in said pump case surrounding said shaft including a plurality of circumferential pockets;
 an external auxiliary source of fluid;
 passage means having a restricted portion communicating with said circumferential pockets, said passage means being in fluid communication with said external auxiliary source of fluid and with said pumping chamber arranged for conducting said product fluid at increased energy level to said pockets of said bearing; and
 a pressure responsive flow control ball disposed for movement with respect to said restricted portion in said passage means, said ball having opposite sides thereof exposed respectively to said product fluid and said auxiliary source of fluid, said ball being movable in response to a predetermined pressure drop in said product fluid to permit flow of said auxiliary fluid to said pocket of said bearing.

* * * * *